United States Patent [19]

Alary

[11] Patent Number: 6,015,442
[45] Date of Patent: Jan. 18, 2000

[54] ALUMINA-BASED ABRASIVE GRAINS AND METHOD FOR PREPARING SAME

[75] Inventor: Jean André Alary, Chedde, France

[73] Assignee: Pem Abrasifs Refractaires, Paris la Defense, France

[21] Appl. No.: 09/051,642

[22] PCT Filed: Oct. 15, 1996

[86] PCT No.: PCT/FR96/01609

§ 371 Date: Sep. 22, 1998

§ 102(e) Date: Sep. 22, 1998

[87] PCT Pub. No.: WO97/14759

PCT Pub. Date: Apr. 24, 1997

[30] Foreign Application Priority Data

Oct. 16, 1995 [FR] France ................................. 95 12316

[51] Int. Cl.[7] ............................. B24D 3/04; B24D 3/28; C09K 3/14
[52] U.S. Cl. .............................. 51/309; 51/298; 51/295; 51/308
[58] Field of Search .......................... 51/298, 308, 309, 51/295

[56] References Cited

U.S. PATENT DOCUMENTS

| | | | |
|---|---|---|---|
| 2,527,044 | 10/1950 | Walton et al. | 51/309 |
| 4,472,173 | 9/1984 | Bruning et al. | 51/309 |
| 5,042,991 | 8/1991 | Kunz et al. | 51/309 |
| 5,213,591 | 5/1993 | Celikkaya et al. | 51/309 |

FOREIGN PATENT DOCUMENTS

| | | |
|---|---|---|
| 281265 A1 | 9/1988 | European Pat. Off. |
| WO 94/02560 | 2/1994 | WIPO |

*Primary Examiner*—Michael Marcheschi
*Attorney, Agent, or Firm*—Pollock, Vande Sande & Amernick

[57] ABSTRACT

Alumina-based abrasive grains having a skin constituted by a mixture of finely dispersed aluminum hydrate and sodium silicate, and a process for the production of such grains consisting of (a) preparing a gel by mixing a solution of sodium silicate and a colloidal solution of aluminum hydrate in acid medium, (b) coating the abrasive grains with the gel in an amount of 0.1 to 5 percent weight, and (c) subjecting the coated grains to a drying treatment at a temperature of between 100 and 500° C. The grains according to the invention are used for the manufacture of cloths and abrasive paper and also grinding wheels.

8 Claims, 1 Drawing Sheet

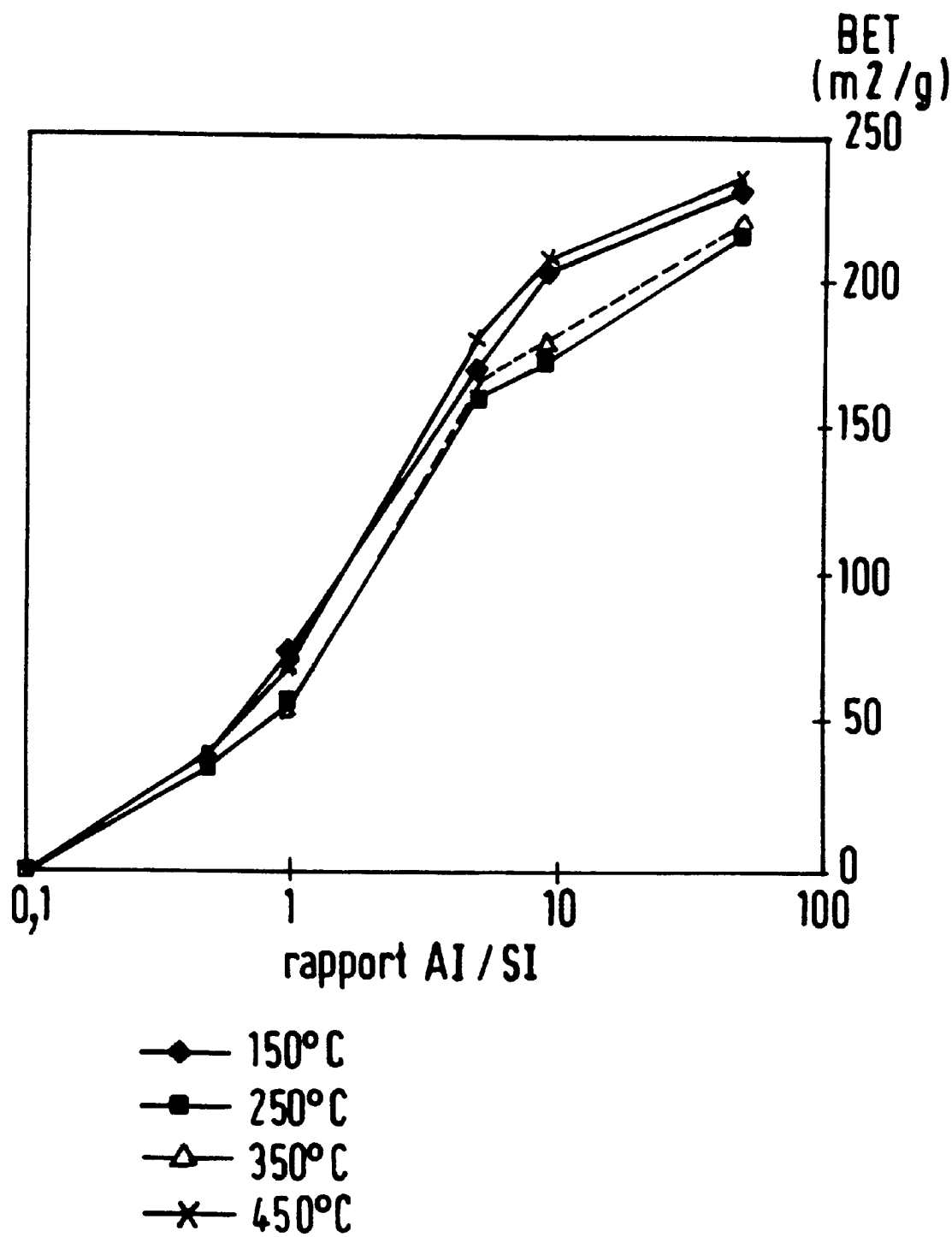

ALUMINA-BASED ABRASIVE GRAINS AND METHOD FOR PREPARING SAME

TECHNICAL FIELD

The invention is concerned with the domain of alumina-based abrasive grains, such as electromolten corundum or corundum-zirconia grains or sintered bauxite grains intended for the production of cloth or abrasive paper as well as that of grinding wheels.

PRIOR ART

The search for abrasive materials of ever increasing performance has, in recent years, given rise to top grade products derived from highly complex ceramic technologies.

Thus, EP 0168606, EP 0171034 and EP 0291029 by NORTON, EP 0200487, EP 273569, EP 0373765 and EP 0471389 by 3M, EP 0263810 and EP 0368837 by TREIBACHER CHEMISCHE WERKE describe the production of polycrystalline sintered aluminum abrasives. As far as most of them are concerned, they are obtained through a combination of the advantages of synthesis methods derived from sol-gel techniques, crystallization initiation techniques wherein fine particles are seeded of the same type as the material to be produced, and ceramic composite production.

The properties of these materials are similar to those of microcrystalline ceramics with a high alumina content, usually above 95%, if the composites are not those with zirconia or titanium nitride dispersoids. Their microhardness and strength are greater than with electromolten products, and their abrasive power is clearly better.

However, the manufacturing cost of these materials which utilize relatively noble raw materials and which employ relatively complex synthesis processes is greater than that of electromolten products.

Moreover, EP 0304616 by LONZA describes alumina-based abrasive grains which have been subjected to surface treatment with a hygroscopic and/or hydrophillic substance. The purpose of this treatment is to improve the capability of the grains to rise within the electrostatic field used in order to orient the grains at the time when they are deposited on a cloth or piece of pre-coated paper. The capability of the grains to move within the electrostatic field, referred to as "rise within the field" is thus dependent on the amount of water absorbed, which, in turn, is very largely dependent on climatic conditions, to be more exact on the humidity of the atmosphere prevailing at the time of the depositing operation onto the sheet or paper.

SUMMARY OF THE INVENTION

It is an object of the invention to obtain, using conventional abrasive materials with moderate manufacturing costs such as electromolten brown or white corundum or corundum-zirconia or sintered bauxite or alumina, properties of use which are close to those of the top grade materials described hereinabove, and also to obtain a satisfactory capability to rise within the electrostatic field irrespective of the climatic conditions of the moment and place in the event.

OBJECT OF THE INVENTION

The invention is based on three factors observed by the applicant during research:

firstly, a rapid rise within the electrostatic field which is independent of the humidity in the atmosphere can be obtained not by using a coating which is hygroscopic or hydrophillic but by using a coating which contains constitution water, i.e., wherein the water molecules form an integral part of the chemical composition of the product, e.g., in hydrate form, and which is either insensitive to water, i.e., insoluble in water and chemically inert to water, at least under normal conditions.

secondly, adhesion of a granular material to a support is closely linked to its surface state, whether the support be organic, e.g., a resin on a sheet of paper, or inorganic as in the case of a vitrified grinding wheel. The coarser the material, the greater the number of anchorage points to the support for which it is intended. The physical property connected with this capability is the specific surface.

thirdly, this adhesion is also dependent on the capability of the granular material to form a chemical bond with the support.

The invention therefore relates to alumina-based abrasive grains such as grains of electromolten corundum or corundum-zirconia or sintered bauxite or alumina with a skin which consists essentially of a mixture of finely dispersed aluminum hydrate (5 to 95% by weight) and sodium silicate (5 to 95% by weight). This skin preferably represents 0.1 to 5% by weight of the grain.

The coated grain has a specific surface which is multiplied by a factor of between 5 and 100 of that of the non-coated grains, this multiplication factor increasing proportionally with the grain size of the grain for coating.

The invention also relates to a process for the preparation of such grains, consisting of:

preparing a gel constituted by a mixture of colloidal aluminum hydrate and sodium silicate in slightly acid aqueous medium, coating the abrasive grains with the gel in an amount of 0.1 to 5 weight percent, subjecting the coated grains to a drying treatment at a temperature of between 100 and 500° C.

The aluminum hydrate used is preferably monohydrate in boehmite form. The acid solution used to prepare the gel is preferably a solution containing between 0.5 and 30% by weight of nitric, acetic or perchloric acid.

DESCRIPTION OF THE PREFERRED EMBODIMENT

The process according to the invention consists firstly in the preparation of a mixture of a commercial solution of sodium silicate with a colloidal solution of aluminum hydrate which is dispersible in a slightly acidic aqueous solution. The aluminum hydrate is preferably a monohydrate in the crystallographic form of boehmite. The acid must be capable of peptizing the aluminum hydrate; this is the case, in particular, with acetic, perchloric and nitric acids. The concentration of the acidic aqueous solution must remain low, at between 0.5 and 30% by weight, and preferably at between 1.5 and 5%.

After it has been stirred for a few minutes, the colloidal solution of alumina stabilizes and can be mixed with the silicate solution in order to produce the gel for coating the grains.

The coating takes place in a mixing device for inorganic powders, e.g., a rotating drum of the type used for the preparation of concrete. The drying treatment is then carried out which can take place continuously on a conveyor belt at the exit from the mixing device.

The specific surface of the coated grain depends, on both the composition of the silicate-alumina mixture, and the drying temperature.

BRIEF DESCRIPTION OF THE DRAWINGS

FIG. 1 shows the development of the BET specific surface of the gel to a function of its composition, represented by the AL/Si ratio at drying temperatures of between 150 and 450° C. for thirty minutes.

It is noted that when the solution contains approximately 10% silicate and 90% aluminum hydrate, even at a drying temperature of 150° C. it is possible to obtain high specific surfaces in excess of 200 m$^2$/g. This result is interesting because the use of a low drying temperature makes it possible to save energy and reduce the manufacturing cost. It is also possible to adjust the composition of the mixture as a function of the properties sought in the intended application.

With the process according to the invention there is always an increase in the specific surface of at least five times that of uncoated grains, and in many cases there is more than a 50 fold increase.

The abrasive grains according to the invention can be used for manufacturing cloth or abrasive paper. In these cases, they are deposited on a pre-coated support using the electrostatic field generated by two conductive plates between which a high electric voltage of about 40 kV is applied. The abrasive grains rise towards one of the electric plates, meeting the pre-coated support en route and placed there. The high specific surface of the grains according to the invention very probably makes it possible for a greater number of electrostatic charges to be attracted by "point" effect, resulting in a more rapid rise within the field, particularly when the humidity in relation to the atmosphere becomes too low (e.g. <30%) or when the grains are too large or too small. Also, there is good resistance to the grains being pulled off because their skin has a large specific surface, and, in the case of aluminum hydrate, is of the same chemical type as the rest of the grain.

The grains according to the invention can also be used for manufacturing grinding wheels by incorporation in a resin. These grinding wheels, particularly when hot, have markedly improved mechanical and abrasive properties in comparison with grinding wheels manufactured from uncoated grains, which makes them particularly well-suited for applications such as cold scarfing in metallurgy.

EXAMPLES

Firstly, a solution A was prepared of sodium silicate with 28.1% silica, marketed by RHONE-POULENC under the name, "Liquid sodium silicate 16N34".

Secondly, a solution B was prepared by dispersing in a solution in water of 2% by weight of nitric acid PROLABO "Rectapur" of density 1.40, DISPERAL dispersible aluminum monohydrate marketed by CONDEA CHIMIE. In this way, following stirring for about ten minutes, a colloidal solution was obtained of 30% by weight alumina which remained stable at ambient temperature for at least eight hours.

Example 1

A mixture C was prepared by adding 18% (by weight) of solution A to 82% of solution B.

This mixture C was used to treat grains of brown corundum SE154 by PECHINEY ELECTROMETALLURGIE with a mean grain size of P50, P100 and P800 as listed by the European Federation of Abrasive Manufacturers[1], and grains of white corundum with a mean grain size of P80, using 10 kg per tonne of abrasive grains. The coating took place in a concrete mixer type apparatus for 20 minutes, and the drying took place at 150° C. in a continuous drier with a belt conveyor which was controlled at a flow rate of 500 kg/h.

In French : la Féderation Européenne des producteurs d'abrasifs (FEPA)

A comparison was made of the BET specific surfaces in m$^2$/g of treated and untreated grains. The results were as follows:

| grains |  | untreated | treated |
|---|---|---|---|
| brown corundum | P50 | <0.03 | 2.30 |
|  | P100 | <0.03 | 1.60 |
|  | P800 | 0.60 | 2.92 |
| white corundum | P80 | <0.03 | 1.70 |

It is noted that the specific surface is multiplied by five for the smallest grain size and by more than 50 in the other cases.

To characterize the rising capability within the electrostatic field during the manufacture of cloths and abrasive paper, the time was measured which was needed for 2.5 g of abrasive grains to move within an electrostatic field obtained by application of a 40 kV electric voltage between 2 electrodes at 10 cm apart and placed in a chamber under controlled hygrometry, with 20% and 60% relative humidity respectively.

The results were as follows:

| | Rise within the field to: | | | |
|---|---|---|---|---|
| | 20% HR | | 60% hr | |
| | Treated | Untreated | Treated | Untreated |
| P50 | 6.7 s | 11.5 s | 6.2 s | 10.5 s |
| P100 | 3.7 s | 9.1 s | 3.9 s | 6.7 s |
| P800 | 9.8 s | impossible | 10.2 s | impossible |
| P80 | 4.2 s | 13.1 s | 3.4 s | 3.9 s |

It is clear that the increase in specific surface of the grains treated in accordance with the invention gives rise to a marked improvement in their capability to rise within the electrostatic field, and that this improvement becomes virtually independent of the humidity in the atmosphere.

Example 2

A mixture C was prepared by adding 2.4 kg (i.e. 30%) of solution a and 5.6 kg (i.e. 70%) of solution B. These 8 kg of mixture C were mixed with one ton of grains of sintered bauxite SO 200 G 20 by PECHINEY ELECTROMETALLURGIE, of between 0.9 and 1.1 mm in diameter, and of a length such that the length:diameter ratio of 85% of the grains was between 2.5 and 1.

After they were stirred for 20 minutes, the coated grains were dried at a temperature of 250° C. by being passed into a drier with a belt conveyor set at a flow rate of 500 kg/h.

Two sets of resinoid grinding wheels of diameter 610 mm and weighing 63 kg were manufactured, one of which was charged with 50% by weight of untreated grains, the other of which was charged with the same quantity of treated grains.

In order to evaluate their mechanical strength at ambient temperature and when hot (after 30 minutes at 250° C., a series of samples was produced having a length of 120 mm and a thickness of 10 mm, and these were subjected to a traction test using an INSTRON INSTRUMENTS traction machine for measuring the tensile strength R and the modulus of elasticity.

The results were as follows:

| grains | 20° C. bare | 20° C. treated | 250° C. bare | 250° C. treated |
|---|---|---|---|---|
| R (MPa) | 70.3 | 82.8 | 43.4 | 46.2 |
| E (GPa) | 42.0 | 44.9 | 19.0 | 24.0 |

It is noted that there is a general improvement as far as the treated grains are concerned, in particular a 25% increase in the modulus of elasticity when hot.

To assess the influence treating the grains has on the abrasive properties of the grinding wheels used for the cold scarfing of steel, grinding tests were carried out under cold conditions on a stainless ferritic steel with 17% chromium, and under hot conditions on a stainless austenitic steel with 18% chromium and 10% nickel under the following conditions:

pressure on the grinding wheel: 1 tonne
grinding angle: 70°
grinding speed 80 m/s.

The results were as follows in kg of metal taken from each grinding wheel

|  | Ferritic | Austenitic |
|---|---|---|
| untreated grains | 1100 | 2500 |
| treated grains | 1500 | 2800 |

A significant improvement was noted in the yield of the grinding wheel using the coated grains, and this improvement became more marked as the working temperature increased.

I claim:

1. An alumina-based abrasive grain having a skin representing 0.1 to 5% by weight of the grain, which consists essentially of a mixture of finely dispersed aluminum hydrate for 5 to 95% of its weight and of sodium silicate for 5 to 95% of its weight.

2. An abrasive grain according to claim 1, wherein the uncoated grain comprises electromolten brown or white corundum.

3. An abrasive grain according to claim 1, wherein the uncoated grain comprises sintered bauxite or alumina.

4. A cloth or abrasive paper formed by deposition of grains according to claim 1 on a cloth or a pre-coated paper.

5. A grinding wheel produced by incorporating grains according to claim 1 in a resin.

6. A process for the treatment of abrasive grains, consisting of:

(a) preparing a gel by mixing a solution of sodium silicate and a colloidal solution of aluminum hydrate in an acid medium;

(b) coating the abrasive grains with the gel in an amount of 0.1 to 5 weight percent; and (c) subjecting the coated grains to a drying treatment at a temperature of between 100 and 500° C.

7. A process according to claim 6, wherein the aluminum hydrate is a monohydrate in boehmite form.

8. A process according to claim 6, wherein the acid solution contains from 0.5 to 30% by weight of nitric, acetic or perchloric acid.

* * * * *